United States Patent [19]

Houlihan et al.

[11] 3,876,659

[45] Apr. 8, 1975

[54] SPIRO TRICYCLIC ISOINDOLINES

[75] Inventors: William J. Houlihan, Mountain Lakes; Jeffrey Nadelson, Parsippany, both of N.J.

[73] Assignee: Sandoz-Wander, Inc., Hanover, N.J.

[22] Filed: Jan. 19, 1973

[21] Appl. No.: 325,077

Related U.S. Application Data

[63] Continuation of Ser. No. 73,596, Sept. 18, 1970, abandoned.

[52] U.S. Cl.... 260/326.1; 260/239 DD; 260/279 R; 260/325 PH; 260/328; 260/335; 260/559 D; 424/257; 424/274
[51] Int. Cl............................................ C07d 27/48

[58] Field of Search.......................... 260/326.1, 279

[56] References Cited
UNITED STATES PATENTS
3,741,980   6/1973   Houlihan et al. ................. 260/326.1

*Primary Examiner*—Joseph A. Narcavage
*Attorney, Agent, or Firm*—Gerald D. Sharkin; Robert S. Honor

[57] ABSTRACT

Spiro tricyclic N-alkyl isoindolines, e.g., 2-methylspiro [isoindoline-1,9'-xanthene], are prepared by treating a corresponding isoindolinone with mild reducing agent. The compounds are useful as analgesics.

6 Claims, No Drawings

SPIRO TRICYCLIC ISOINDOLINES

This is a continuation of application Ser. No. 73,596, filed Sept. 18, 1970, now abandoned.

This invention relates to spiro tricyclic isoindolines. More particularly, it relates to substituted and unsubstituted spiro isoindoline xanthenes and thioxanthenes, acridan isoindolines, dibenzothiepin isoindolines, dibenzoxepin isoindolines, anthracene isoindolines and isoindoline morphanthridines, acid addition salts and intermediates thereof, and processes for the preparation of these materials.

The compounds of this invention may be represented by the following structural formula:

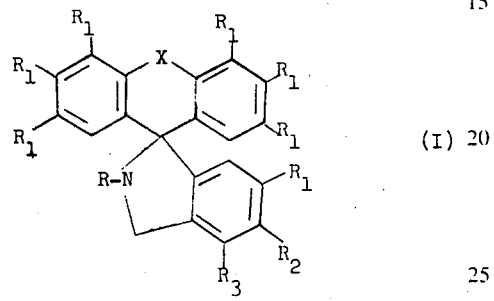

(I)

wherein
X represents

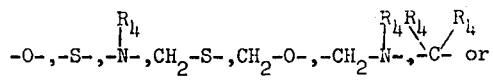

a direct bond;

R represents primary and secondary loweralkyl, i.e., primary and secondary alkyl having 1–5 carbon atoms such as methyl, ethyl, and isopropyl;
each $R_1$, independently, represents hydrogen, halo having an atomic weight of 19 to 36, trifluoromethyl, loweralkoxy, i.e., alkoxy having 1 to 5 carbon atoms, e.g., methoxy, ethoxy, propoxy, isopropoxy, butoxy, isobutoxy and the like or loweralkyl, i.e., alkyl having 1–5 carbon atoms such as methyl, ethyl, propyl, isopropyl and the like;

$R_2$ represents hydrogen, trifluoromethyl, lower alkyl, as previously defined, or lower alkoxy as previously defined;

$R_3$ represents hydrogen, halo having an atomic weight of 19 to 36, or lower alkoxy as previously defined;

and
$R_4$ represents hydrogen or straight chain loweralkyl having 1–4 carbon atoms such as methyl, ethyl or propyl;

or two of $R_1$ together represent methylenedioxy, provided they are on adjacent carbon atoms,
provided no two trifluoromethyl groups are on adjacent carbon atoms, provided also that no more than three of $R_1$, $R_2$ and $R_3$ are other than hydrogen and that no more than two of $R_1$, $R_2$ and $R_3$ are other than hydrogen in one ring.

The compounds of formula (I) may be prepared as represented by the following reaction scheme:

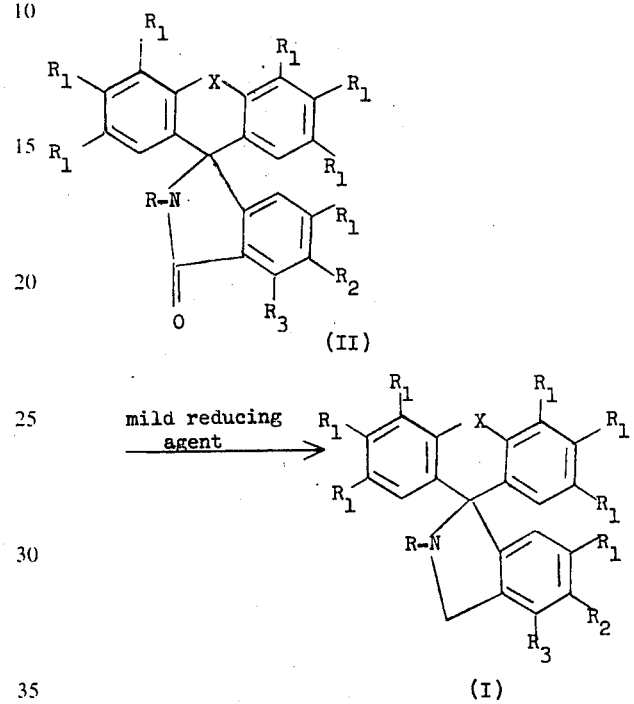

wherein R, $R_1$, $R_2$, $R_3$ and X and the provisos have the above-stated significance.

According to this aspect of the invention, the compounds of formula (I) are prepared by reducing a compound of formula (II) with a mild reducing agent, particularly metal hydride, e.g., lithium aluminum hydride, diisobutylaluminum hydride, diborane, or sodium bis-(2-methoxyethoxy) aluminum hydride, in inert solvent and inert atmosphere, e.g., nitrogen gas, at a temperature of from about −10°C. to 150°C., conveniently at the reflux temperature of the system, for about 15 to 48 hours, preferably about 18 to 24 hours. Solvents which may be used include ethers such as ethyl ether or tetrahydrofuran, or hydrocarbon solvents such as benzene, toluene and the like. The temperature, reaction times and solvents used are not critical. The compounds of formula (I) may be recovered using conventional recovery techniques such as crystallization.

The compounds of formula (II), a further aspect of this invention, may be prepared according to the following reaction scheme:

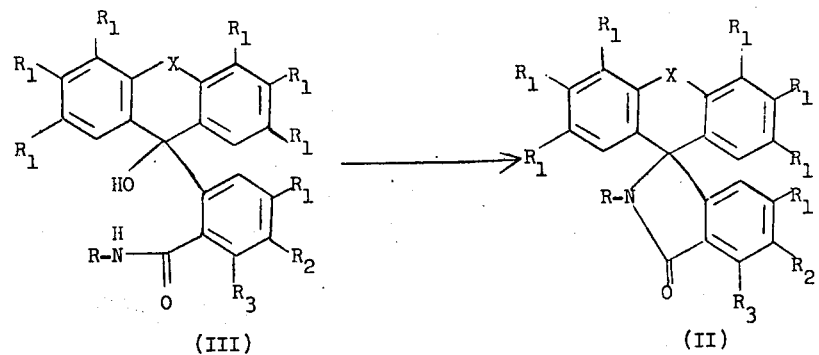

wherein R, R₁, R₂, R₃, X and the provisos have the above-stated significance.

The compounds of formula (II) are prepared by cyclizing a compound of formula (III) in an aqueous or non-aqueous media with mineral acid, such as sulfuric acid, a hydrohalic acid such as hydrochloric or hydrobromic acid, phosphoric acid and the like, at a temperature of from about 70° to 120°C., conveniently at the reflux temperature of the system. More preferably, and for generally improved yields, the compounds (II) may be prepared from compounds of formula (III) by treatment with organic acids or their anhydrides, such as acetic acid, trifluoroacetic acid, acetic acid anhydride, trifluoroacetic acid anhydride and the like, at a temperature of about −10° to +10°C., preferably −5° to +5°C. The anhydrides are preferred and trifluoroacetic acid anhydride is a particularly preferred cyclizing agent.

The reaction is suitably conducted for about 1–48 hours, preferably 24–48 hours for the mineral acids and 1–24 hours for the organic acids or their anhydrides. The presence of solvent is not necessary and generally is not desired since it could interfere with the obtaining of the compounds (II). To improve yields and obtain a better quality product, the reaction may be performed under inert atmosphere, e.g., nitrogen gas. Neither the time nor temperature of reaction is critical. Compounds (II) may be recovered using conventional recovery techniques, such as filtration.

In some instances, such as when X on compounds (II) and (III) is a direct bond, e.g., when (III) represents o-(9-hydroxy-9-fluorenyl)-N-methylbenzamide, it has been found that greatly improved yield of the compounds (II) is obtained when the product formed, possibly a corresponding substituted imino phthalan, is treated with mineral acid, preferably a hydrohalic acid such as hydrochloric acid, for about 12–24 hours at about 40°–100°C. The product (II) may then be recovered by conventional techniques. Neither the time nor the temperature of reaction are critical.

According to a still further aspect of this invention, the new and novel compounds (III) may be prepared as illustrated in the following reaction scheme from compounds (IV) and (V).

erably by adding the reaction mixture to water or ice, or aqueous solutions normally used for hydrolysis, e.g., ammonium chloride solution, at about 0° to 10°C. The product may then be used directly for the preparation of compounds (II).

It will be understood that certain of the compounds of formulas (I), (II) and (III) exist in racemic form or in the form of optically active isomers. The separation of the respective isomers may be accomplished employing conventional techniques and such isomers are included within the scope of the invention.

Certain of the compounds of formulae (IV) and (V) are known and may be prepared by methods described in the literature. Those compounds of formulae (IV) and (V) not specifically described may be prepared by analogous methods from known materials.

The compounds of formuls (I) are useful because they possess pharmacological activity in animals, such as mammals. In particular, the compounds possess analgesic activity as indicated by their activity in mice at 25 mg/kg orally when tested using the "Hot-Plate" method of Woolfe and McDonald (J. Pharmacol. and Exper. Therap. 80:300, 1944).

When so utilized, the compounds may be combined with one or more pharmaceutically acceptable carriers or adjuvants. Depending upon the particular active compound employed, the exact dosage utilized may vary.

Furthermore, the compounds of formula (I) may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzenesulfonate and the like.

As noted above, the compounds of formula (I) exist as optical isomers. In some cases greater pharmacological activity or other beneficial attribute may be found for a particular isomer and in such instances adminis-

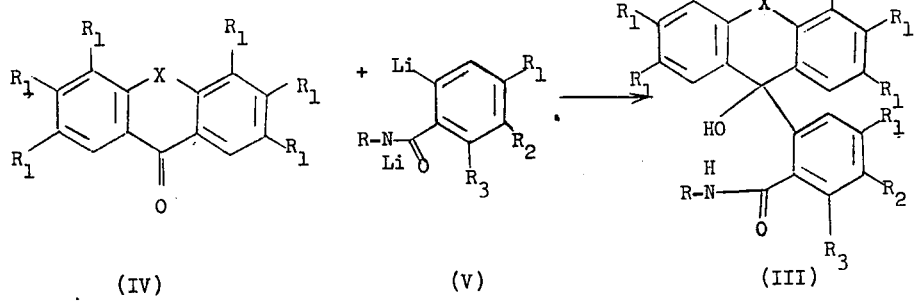

(IV)    (V)    (III)

where R, R₁, R₂, R₃, X and the provisos have the above stated significance.

Compounds (III) may be prepared by condensing a compound (IV) with a compound (V) in an inert solvent such as ethers, e.g. diethyl ether or tetrahydrofuran, or hydrocarbons or aromatic hydrocarbons such as hexane, heptane, benzene, toluene and the like. This condensation may be carried out at a temperature of from about −10° to +10°C., preferably −5° to +5°C. for about 1 to 3 hours. The exact time and temperature of reaction and the particular solvent used is not critical. The resulting reaction product is then hydrolyzed, preftration of such isomer may be preferred.

In general, satisfactory results are obtained when the compounds are administered orally at a daily dosage of from about 0.1 – 100 mg/kg of animal body weight, preferably given in divided doses, 2 to 4 times a day or in sustained release form. For most larger mammals (e.g., primates) the total daily dosage is from about 5 milligrams to about 400 milligrams. Dosage forms suitable for internal use comprise from about 1.5 milligrams to about 200 milligrams of the active compound in intimate admixture with a solid or liquid pharmaceutically acceptable carrier or diluent.

A representative formulation suitable for oral administration is a capsule prepared by standard techniques which contains the following

| Ingredients: | Parts by weight: |
|---|---|
| 2-methylspiro[isoindoline-1,9'-xanthene] | 25 |
| Inert filler (starch, kaolin, lactose, etc.) | 275 |

A preferred aspect of this invention includes compounds of formula (I) where R and X are as previously defined, $R_1$ on the isoindoline moiety is as previously defined and all other substituents including $R_1$, $R_2$ and $R_3$ represent hydrogen. Most preferred are those compounds wherein X represent —O— or —S—. The corresponding compounds of formulas (II) and (III) are similarly preferred.

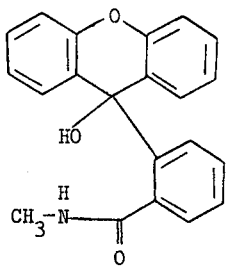

To a flask equipped with a stirrer, dropping funnel, condenser and gas inlet tube maintained under a nitrogen atmosphere there is added at room temperature 15.2 g. (0.108 mole) of N-methyl benzamide and 150 ml. dry tetrahydrofuran. The reaction flask is immersed in an ice bath and cooled to an internal temperature of 5°C. Stirring is initiated and 152 ml. of 1.6 M n-butyllithium (0.24 mole) in hexane is added dropwise in ca 1 hour maintaining the temperature below 8°C. The resulting red dilithio salt is stirred at 5°C. for an additional hour and then a solution of 21.2g. (0.108 mole) of xathen-9-one in 75 ml. of anhydrous tetrahydrofuran is added dropwise in ca 45 min. maintaining the temperature between −10° and 10°C. The resulting mixture is stirred at 5°C. for 1 hour longer and then poured with stirring onto 300 g. of ice while maintaining the temperature below 10°C. The layers are separated, the tetrahydrofuran layer dried over anhydrous magnesium sulfate, and filtered and evaporated in vacuo. The resulting oil is triturated with cold ethyl ether and filtered to give crude o-(9-hydroxy xanthen-9-yl)-N-methylbenzamide.

When the above procedure is carried out and 2-methyl thioxanthen-9-one is used in place of xathen-9-one, there is obtained o-(9-hydroxy-2-methyl thioxanthen-9-yl)-N-methylbenzamide.

EXAMPLE 2 o-(9-hydroxy-3-chloro acridan-9-yl)-N-methylbenzamide

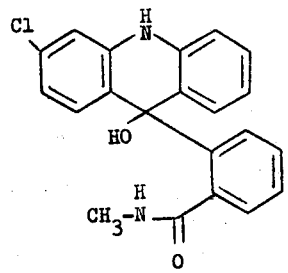

When the above process of Example 1 is carried out and 3-chloro acridan-9-one is used in place of xanthen-9-one, there is obtain o-(9-hydroxy-3-chloro-acridan-9-yl)-N-methylbenzamide.

When the above process is carried out and 10-ethyl-2-methoxy acridan-9-one is used in place of 3-chloro-acridan-9-one, there is obtained o-(10-ethyl-9-hydroxy-2-methoxy acridan-9-yl)-N-methylbenzamide.

EXAMPLE 3 o-(6-,11-dihydro-11-hydroxy dibenzo[b,e]thiepin-11-yl)-N-methylbenzamide

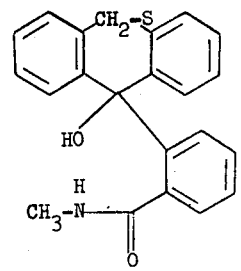

When the procedure of Example 1 is carried out and dibenzo[b,e]thiepin-11(6H)-one is used in place of xanthen-9-one, there is obtained o-(6,11-dihydro-11-hydroxy dibenzo[b,e]thiepin-11-yl)-N-methylbenzamide.

When the above procedure is carried out and 4-trifluoromethyl dibenzo[b,e]oxepin-11(6H)-one is used in place of dibenzo[b,e]thiepin-11(6H)-one, there is obtained o-(6,11-dihydro-11-hydroxy-4-trifluoromethyl dibenzo[b,e]oxepin-11-yl)-N-methylbenzamide having the structure

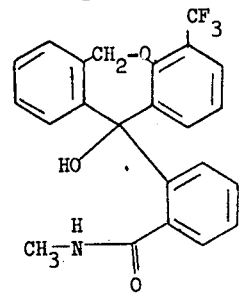

EXAMPLE 4 o-(5,6-dihydro-11-hydroxy-2,3-methylenedioxy morphanthridin-11-yl)-N-methyl benzamide

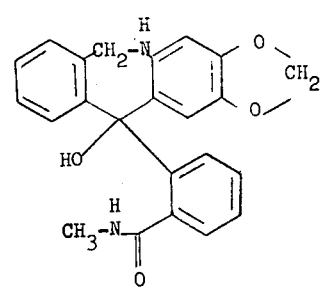

When the procedure of Example 1 is carried out and 5,6-dihydro-2,3-methylenedioxy morphanthridin-11-one is used in place of xanthen-9-one, there is obtained o-(5,6-dihydro-11-hydroxy-2,3-methylenedioxy morphanthridin-11-yl)-N-methyl benzamide.

When the above process is carried out and 5,6-dihydro-5-methyl morphanthridin-11-one, 10,10-dimethyl anthrone or 9-fluorenone is used in place of 5,6-dihydro-2,3-methylenedioxy morphanthridin-11-one, there is obtained o-(5,6-dihydro-11-hydroxy-5-methyl morphanthridin-11-yl)-N-methyl benzamide, o-(9,10-dihydro-10,10-dimethyl-9-hydroxy anthracen-9-yl)-N-methyl benzamide, or o-(9-hydroxy-9-fluorenyl)-N-methylbenzamide, respectively.

When the process of Example 1 is carried out and o-chloro-N-methyl benzamide or m-methoxy-N-ethyl benzamide is used in place of N-methyl benzamide there is obtained 6-chloro-2-(9-hydroxy xanthen-9-yl)-N-methyl benzamide or 2-(9-hydroxy xanthen-9-yl)-5-methoxy-N-ethyl benzamide, respectively.

EXAMPLE 5

2-Methylspiro[isoindoline-1,9'-xanthene]-3-one

To a flask equipped with a stirrer, condenser and gas inlet tube maintained under a nitrogen atmosphere there is added at room temperature 100 g. of trifluoroacetic acid anhydride. The flask is cooled to an internal temperature of 0°C. and 31 g. of the crude o-(9-hydroxy- xanthen-9-yl)-N-methylbenzamide obtained in Example 1 is added in portions with stirring. The reaction mixture is maintained at 0°C. for 1 hour, at room temperature for 19 hours, and is then evaporated in vacuo. The oily residue is dissolved in methylene chloride and washed with 100 ml. of water, 100 ml. of 2N sodium hydroxide and again 100 ml. of water, dried over magnesium sulfate, filtered and evaporated in vacuo. The resulting solid is triturated with cold ethyl ether and the ether insoluble material is recrystallized from hot benzene to give 2-methylspiro[isoindoline-1,9'-xanthene]-3-one; m.p. 190°–191°C.

When the above procedure is carried out and a. o-(9-hydroxy-2-methyl-thioxanthen-9-yl)-N-methylbenzamide, b. o-(9-hydroxy-3-chloro-acridan-9-yl)-N-methylbenzamide, c. o-(10-ethyl-9-hydroxy-2-methoxy acridan-9-yl)-N-methylbenzamide, d. o-(6,11-dihydro-11-hydroxy dibenzo[b,e,]thiepin-11-yl)-N-methylbenzamide, e. o-(6,11-dihydro-11-hydroxy-4-trifluoromethyl dibenzo[b,e]oxepin-11-yl)-N-methylbenzamide, f. o-(5,6-dihydro-11-hydroxy-2,3-methylenedioxy morphanthridin-11-yl)-N-methylbenzamide, g. o-(5,6-dihydro-11-hydroxy-5-methyl morphanthridin-11-yl)-N-methylbenzamide, h. o-(9,10-dihydro-10,10-dimethyl-9-hydroxy anthracen-9-yl)-N-methylbenzamide, i. 6-chloro-2-(9-hydroxy xanthen-9-yl)-N-methylbenzamide, j. 2-(9-hydroxy xanthen-9-yl)-5-methoxy-N-ethyl benzamide, or k. o-(9-hydroxy-9-fluorenyl--)-N-methylbenzamide is used in place of o-(9-hydroxy xanthen-9-yl)-N-methylbenzamide, there is obtained a. 2,2'-dimethylspiro[isoindoline-1,9'-thioxanthene]-3-one, b. 3-chloro-2'-methylspiro[acridan-9,1'-isoindoline]-3'-one, c. 10-ethyl-2-methoxy-2'-methylspiro[acridan-9,1'-isoindoline]-3'-one, d. 2'-methylspiro[dibenzo[b,e]thiepin-11(6H),1'-isoindoline]-3'-one, e. 2'-methyl-4-trifluoromethylspiro[dibenz[b,e]oxepin-11(6H),1'-isoindoline]-3'-one, f. 5',6'-dihydro-2-methyl-2',3'-methylenedioxyspiro[isoindoline-1,11'-morphanthridine]-3-one, g. 5',6'-dihydro-2,5'-dimethylspiro[isoindoline-1,11'-morphanthridine]-3-one, h. 2',10,10-trimethylspiro[anthracene-9(10H),1'-isoindoline]-3'-one, i. 4-chloro-2-methylspiro[isoindoline-1,9'-xanthene]-3-one, j. 2-ethyl-5-methoxyspiro[isoindoline-1,9'-xanthene]-3-one, or k. 2'-methylspiro[fluorene-9,1'-isoindolene]-3'-one, respectively.

To improve the yield of 2'-methylspiro[fluorene-9,1'-isoindoline]-3'-one obtained as indicated above, the reaction product obtained according to k), Example 5, is heated to 80°C. in 2N hydrochloric acid for 18 hours and the reaction mixture is extracted with methylene chloride, dried over magnesium sulfate and evaporated in vacuo.

EXAMPLE 6

2-Methylspiro[isoindoline-1,9'-xanthene]

To a flask equipped with a stirrer, condenser, and gas inlet tube maintained under a nitrogen atmosphere there is added at room temperature 1.14 g. (0.03 mole) of lithium aluminum hydride and 50 ml. of anhydrous tetrahydrofuran. Stirring is initiated and a solution of 7.9 g. (0.021 mole) of 2-methylspiro[isoindoline-1,9'-xanthene]-3-one in 120 ml. of anhydrous tetrahydrofuran is added dropwise in ca. 30 minutes. The resulting mixture is refluxed for 18 hours and cooled in an ice bath. Ethylacetate (6.8 ml) is added dropwise in ca. 10 minutes, followed by the dropwise addition of 2.3 ml. of 2N of sodium hydroxide in ca. 10 minutes and the dropwise addition of 3.4 ml. of water in ca. 10 minutes. The resulting mixture is dried over anhydrous magnesium sulfate, filtered and evaporated in vacuo to give a semi-solid which is triturated with hot ether. The filtrate is evaporated in vacuo and the residue recrystallized from ether to give 2-methylspiro[isoindoline-1,9'-xanthene], m.p. 124°–126°.

When the above process is carried out and in place of 2-methyl-spiro[isoindoline-1,9'-xanthene]-3-one there is used a. 2,2'-dimethylspiro[isoindoline-1,9'-thioxanthene]-3-one, b. 3-chloro-2'-methylspiro[acridan-9,1'-isoindoline]-3'-one, c. 10-ethyl-2-methoxy-2'-methylspiro[acridan-9,1'-isoindoline]-3'-one, d. 2'-methylspiro[dibenzo[b,e,]thiepin-11(6H), 1'-isoindoline]-3'-one, e. 2'-methyl-4-trifluoromethylspiro[dibenz[b,e]oxepin-11(6H), 1'-isoindoline]-3'-one, h. 5',6'-dihydro-2-methyl-2',3'-methylenedioxyspiro[isoindoline-1,11'-morphanthridine]-3-one, g. 5',6'-dihydro-2,5'-dimethylspiro[isoindoline-1,11'-morphanthridine]-3-one, 2',10,10-trimethylspiro[anthracene-9(10H),1'-isoindoline]-3'-one, i. 4-chloro-2-methylspiro[isoindoline-1,9'-xanthene]-3-one, j. 2-methyl-5-methoxyspiro[isoindoline-1,9'-xanthene]-3-one, or k. 2'-ethylspiro[fluorene-9,1'-isoindolene]-3'-one, there is obtained
a. 2,2'-dimethylspiro[isoindoline-1,9'-thioxanthene],
b. 3-chloro-2'-methylspiro[acridan-9,1'-isoindoline],
c. 10-ethyl-2-methoxy-2'-methylspiro[acridan-9,1'-isoindoline,
d. 2'-methylspiro[dibenzo[b,e]thiepin-11(6H),1'-isoindoline].
e. 2'-methyl-4-trifluoromethylspiro[dibenz[b,e]oxepin-11(6H),1'-isoindoline,
f. 5',6'-dihydro-2-methyl-2',3'-methylenedioxyspiro[isoindoline-]-1,11'-morphanthridine],
g. 5',6'-dihydro-2,5'-dimethylspiro[isoindoline-]-1,11'-morphanthridine],
h. 2',10,10-trimethylspiro[anthracene-9(10H).1'-isoindoline],
i. 4-chloro-2-ethylspiro[isoindoline-1,9'-xanthene],
j. 2-methyl-5-methoxyspiro[isoindoline-1,9'-xanthene], or
k. 2'-methylspiro[fluorene-9,1'-isoindoline], respectively.

What is claimed is:
1. A compound of the formula

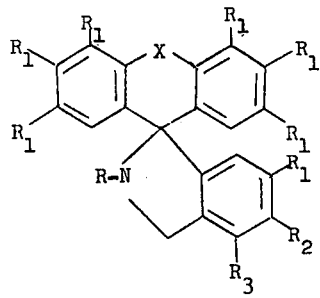

wherein
X represents

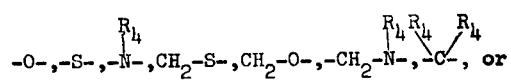

a direct bond;
R represents primary and secondary loweralkyl, each
R$_1$ independently, represents hydrogen, halo having an atomic weight of 19 to 36, trifluoromethyl, lower alkoxy or lower alkyl;
R$_2$ represents hydrogen, trifluoromethyl, loweralkoxy or lower alkyl;
R$_3$ represents hydrogen, halo having an atomic weight of 19-36, or lower alkoxy; and
R$_4$ represents hydrogen or straight chain loweralkyl having 1-4 carbon atoms;
or two of
R$_1$ together represent methylenedioxy, provided they are on adjacent carbon atoms;
provided no two trifluoromethyl groups are on adjacent carbon atoms, provided also that no more than three of R$_1$, R$_2$ and R$_3$ are other than hydrogen, and that no more than two of R$_1$, R$_2$ and R$_3$ are other than hydrogen in one ring, or a pharmaceutically acceptable acid addition salt thereof.

2. The compound of claim 1 which is 2-methylspiro[isoindoline-1,9'-xanthene].

3. A process for preparing a compound of claim 1 in free base form, which comprises treating a compound of the formula

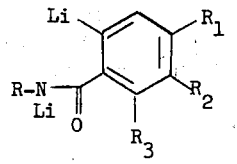

with a compound of the formula

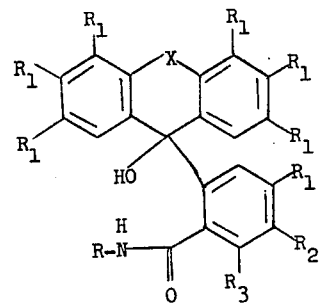

in inert solvent, subjecting the resulting reaction mixture to hydrolysis to provide a compound of the formula

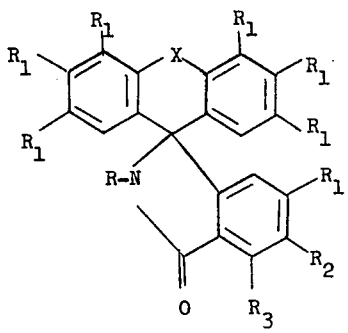

treating the latter with mineral acid, organic acid or organic acid anhydride in the absence of solvent to obtain a compound of the formula

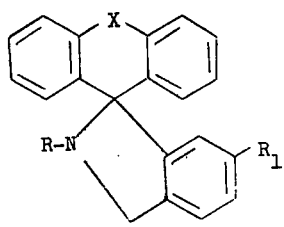

and treating the latter with metal hydride reducing agent, wherein X, R, R$_1$, R$_2$, R$_3$ and the provisos are as set out in claim 1.

4. A compound of the formula where
R, R$_1$ and X are as defined in claim 1.
5. A compound of the formula

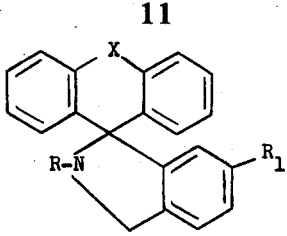

where

X represents —O— or —S—,

R represents primary or secondary lower alkyl, and $R_1$ represents hydrogen, halo having an atomic weight 19–36, trifluoromethyl, lower alkoxy or lower alkyl, or a pharmaceutically acceptable acid addition salt thereof.

6. A compound according to claim 1 which is 2,2'-dimethylspiro[isoindoline-1,9'-thioxanthene], 3-chloro-2'-methylspiro[acridan-9,1'-isoindoline], 10-ethyl-2-methoxy-2'-methylspiro[acridan-9,1'isoindoline],
2'-methylspiro[dibenzo[b,e,]thiepin-11(6H),1'-isoindoline],
2'-methyl-4-trifluoromethylspiro[dibenz[b,e]oxepin-11(6H),1'-isoindoline],
5',6'-dihydro-2-methyl-2',3'-methylenedioxyspiro[isoindoline-1,11'-morphanthridine],
5',6'-dihydro-2,5'-dimethylspiro[isoindoline-1,11'-morphanthridine],
2',10,10-trimethylspiro[anthracene-9(10H),1'-isoindoline],
4-chloro-2-methylspiro[isoindoline-1,9'-xanthene],
2-methyl-5-methoxyspiro[isoindoline-1,9'-xanthene], or
2'-methylspiro[fluorene-9,1'-isoindoline].

* * * * *